United States Patent [19]
Barrett et al.

[11] 3,789,846
[45] Feb. 5, 1974

[54] FASTENING APPARATUS FOR OSTOMY APPLIANCES

[75] Inventors: Donald Dean Barrett, Palos Hills, Ill.; Kenneth R. Whalen, Worth, Ill.; Charles Nichols, Arlington Heights, Ill.; Robert G. Knapp, Wheaton, Ill.; Jay A. Wickum, Westmont, Ill.; Daniel A. Maust, Winfield, Ill.

[73] Assignee: Marsan Manufacturing Co., Inc., Chicago, Ill.

[22] Filed: Nov. 20, 1972

[21] Appl. No.: 307,936

Related U.S. Application Data
[63] Continuation of Ser. No. 105,286, Jan. 11, 1971, abandoned.

[52] U.S. Cl. ............................................ 128/283
[51] Int. Cl. ............................................ A61f 5/44
[58] Field of Search ................................ 128/283

[56] References Cited
UNITED STATES PATENTS
| | | | |
|---|---|---|---|
| 3,076,458 | 2/1963 | Mason | 128/283 |
| 3,100,488 | 8/1963 | Orowan | 128/283 |
| 3,123,074 | 3/1964 | Turner | 128/283 |
| 3,481,336 | 12/1969 | Ipson | 128/283 |
| 3,557,790 | 1/1971 | Hauser | 128/283 |

FOREIGN PATENTS OR APPLICATIONS
| | | | |
|---|---|---|---|
| 574,821 | 3/1958 | Italy | 128/283 |

*Primary Examiner*—Charles F. Rosenbaum
*Attorney, Agent, or Firm*—Alvin D. Shulman

[57] ABSTRACT

A fastening apparatus for securing ostomy appliances which apparatus includes a belt and fastening elements provided with structure for releasably securing, at an ostomy site, a rigid base gasket and an expendable retainer gasket and attached pouch, to retain the base gasket in place during removal and replacement of the expendable retainer gasket and pouch.

11 Claims, 6 Drawing Figures

PATENTED FEB 5 1974　　　3,789,846
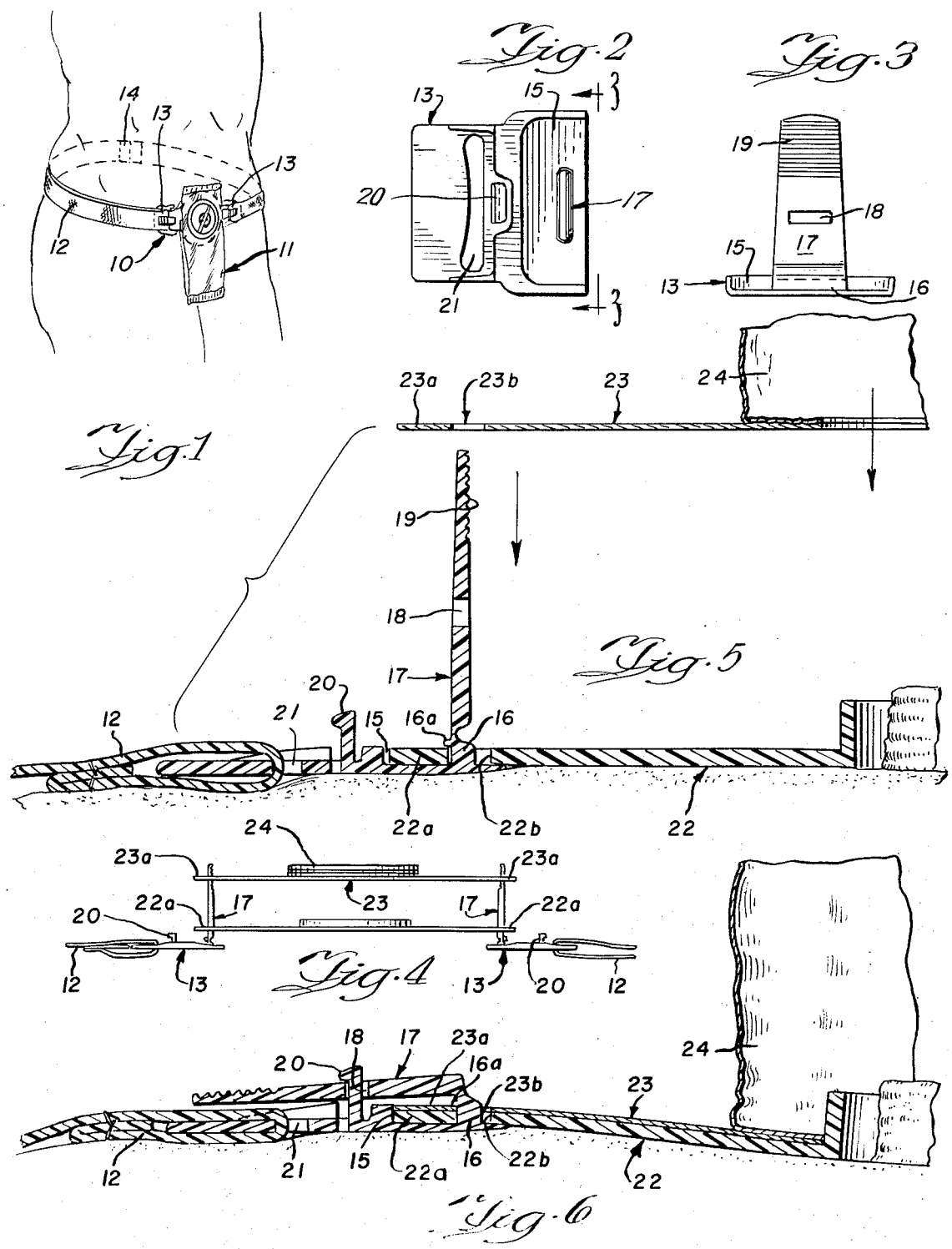

FASTENING APPARATUS FOR OSTOMY APPLIANCES

This is a continuation, of application Ser. No. 105,286, filed Jan. 11, 1971 and now abandoned.

BACKGROUND OF THE INVENTION

This invention relates to fastening apparatus for securing waste material collecting appliances to the bodies of patients who have undergone surgical drainage procedures such as colostomies, ileostomies, urinary diversions, or the like. While reference will hereinafter be made to the use of the fastening apparatus of the invention with colostomy appliances, it will be understood that the apparatus is equally susceptible to use with other ostomy appliances.

If a colostomy procedure is to be fully effective and beneficial to a particular patient, appropriate post-surgical apparatus and procedures must be provided for the sanitary, convenient and esthetically acceptable collection and removal of waste material from the colostomy site. To this effect devices such as those shown, for example, in U.S. Letters Pat. No. 3,483,868, have been developed. Such devices include relatively rigid, base gaskets which are positioned immediately adjacent the colostomy site and which are employed in conjunction with expendable pouches attached to retainer gaskets.

Employment of such devices anticipates the collection of wastes in the expendable pouch followed by the periodic removal of the used pouch and attached retainer gasket and replacement with a new, empty pouch. During this removal and replacement procedure it is most advantageous that the base gasket be retained, undisturbed, in its position at the colostomy site in order to avoid needless pain to the patient and possible contamination of the colostomy site. However, achievement of this desirable advantage has to a great extent been frustrated because of the use of conventional fastening apparatus for securing the colostomy device to the body of the patient.

Fastening apparatus heretofore provided for so securing colostomy appliances has included an expandable elastic belt having spring-action metal buckles. These buckles releasably secured both the base gasket and retainer gasket of the appliance by slots provided in flanges on the gaskets. With such buckles, release of the retainer gasket will necessarily be accompanied by release of the base gasket from a secured position. The release of one flange of the base gasket before the release of another causes a displacing pull on the base gasket by the remaining secured portion or portions of the elastic belt. Thus, in order to allow only the minimum displacement of the base gasket during release and removal of the pouch and retainer gasket, the difficult manipulative procedure of simultaneously disengaging all securing buckles must be performed. Further, since the base gasket is thereafter unsecured, great care must be exercised in removing the used pouch and retainer gasket and in positioning a new pouch and retainer gasket. Then if displacement of the base gasket is to be avoided, the even more difficult manipulative procedure of simultaneously re-engaging all securing buckles must be performed.

SUMMMARY OF THE INVENTION

The present invention provides fastening apparatus for securing colostomy appliances which permits removal and replacement of expendable pouches and retainer gaskets without displacing or disturbing the base gasket of the appliance. One embodiment of the invention includes fastener elements having structure for releasably securing a base gasket and a retainer gasket of a colostomy appliance and for retaining the base gasket in place during the release and subsequent removal and replacement of the retainer gasket and attached pouch.

Another aspect of the invention includes providing such fasteners of an economical unitary molded plastic construction.

Further aspects and advantages of the present invention will be apparent from the following description of a preferred embodiment thereof, reference being made to the following drawings.

BRIEF DESCRIPTION OF THE DRAWINGS

FIG. 1 shows a colostomy appliance secured to the body of a patient by apparatus constituting an embodiment of the present invention.

FIG. 2 is a top plan view of an embodiment of a fastener element of the invention.

FIG. 3 is a sectional view taken along line 3—3 of FIG. 2, rotated through 90°.

FIG. 4 is a fragmentary sectional view of the apparatus, showing the relation of an unsecured colostomy appliance thereto.

FIG. 5 is an enlarged fragmentary view of one of the fastener elements of the embodiment of FIG. 4, with the flange of a colostomy appliance base gasket in secured position and retainer gasket about to be secured.

FIG. 6 is an enlarged fragmentary view of one of the fastener elements of the embodiment of FIG. 4, with flanges of both the base and retainer gaskets of a colostomy appliance in secured position.

DESCRIPTION OF A PREFERRED EMBODIMENT

Referring first to FIG. 1, an embodiment 10 of the fastening apparatus of the invention secures a colostomy appliance 11 to the body of a patient. Belt 12 cooperates with fastener elements 13, 13 to perform this function.

Belt 12 is preferably of an expandable, elastic type and may be provided with movable buckling means 14 for adjusting the length of the belt to the girth of the patient.

A single fastening element 13, constructed according to the present invention is shown in FIGS. 2 and 3. Referring also to FIG. 4, the body of the fastener element 13 has recessed portion 15 for accommodating a pair of superimposed flange portions, one flange portion 22a of a colostomy appliance base gasket 22 and another flange portion 23a of a retainer gasket 23.

Extending outwardly from recess 15 is a projection 16, having lip 16a, and hingedly affixed to projection 16 is a tongue 17. Projection 16, lip 16a and tongue 17 are receivable through a slot 22b in base gasket flange 22a (FIG. 5) and slot 23b in retainer gasket flange 23a (FIG. 6). Tongue 17 is provided with a slot 18 intermediate the body of the tongue and the tongue preferably has a serrated surface 19 to facilitate gripping.

The body of the fastener element 13 is further provided with a hook-like projection 20 (FIGS. 5 and 6) receivable through slot 18 of tongue 17 for releasably securing the tongue in a close position. A slot 21 in element 13 receives belt 12 therethrough to connect element 13 to the belt.

Fastener element 13 is preferably constructed of an economical, unitary molded plastic material. Polypropylene is an exceptionally suitable material for this purpose because it is durable yet sufficiently flexible to allow repeated hinged movement of tongue 17 about projection 16 and to allow resilient movement of hook-like projection 20 through slot 18 to releasably secure tongue 17 in a closed position.

FIG. 4 illustrates the cooperative relationship of a pair of fastener elements 13, 13 with a rigid base gasket 22 and a flexible retainer gasket 23 of a colostomy appliance 11. Tongues 17, 17 are shown in upright, open positions receiving the two gaskets as they are initially applied to the patient's body.

FIG. 5 shows rigid base gasket 22 secured by fastener element 13 with hinged tongue 17 in an upright position. In reaching this position, slot 22b on flange 22a of base gasket 22 has been passed over upright tongue 17 and projection 16, down into recess 15. As this operation takes place with respect to opposite flanges 22a, 22a (FIG. 4) of base gasket 22, tension from belt 12 urges fastener elements 13, 13 outwardly from base gasket 22, thus moving lip 16a of projection 16 over flange 22a thereby securing the latter in place.

FIG. 6 shows both rigid base gasket 22 and retainer gasket 23 in a secured position with hinged tongue 17 moved downward to a closed position. Once base gasket 22 is secured as described above, retainer gasket 23 is positioned by passing slot 23b of flange 23a over upright tongue 17 and projection 16, down into recess 15 atop base gasket 22. Once retainer gasket 23 is in place, hinged tongue 17 is pivoted downwardly from its upright position and is releasably secured or locked in its closed position by hook-like element 20 extending through slot 18.

While it is preferable that retainer gasket 23 be secured under lip 16a of projection 16 as shown, it is not necessary because the retainer gasket may be held in place by hinged tongue 17 alone when the latter is pivoted to its closed position.

In practice, once rigid base gasket 22 has been initially positioned, it will remain thusly secured during replacement of expendable retainer gaskets and attached pouches. The unlocking of hinged tongue 17 by pivoting it to its upright position (FIG. 5) and the removal of retainer gasket 23 will not disturb base gasket 22 in its secured position under lip 16a of projection 16. Likewise, positioning a new retainer gasket 23 and pivoting tongue 17 downwardly to its closed position will not disturb base gasket 22.

Obviously, modifications and variations of the above-described invention may be made without departing from the spirit and scope thereof. Therefore, only such limitations as are indicated in the appended claims shall be placed thereon.

What is claimed is:

1. Fastening apparatus for use in securing an ostomy appliance which includes a rigid base gasket having at least two slotted flanges extending in opposed directions and a retainer gasket having at least two slotted flanges extending in opposed direction, which retainer gasket has affixed thereto an expendable ostomy pouch, said fastening apparatus comprising:
   means mounting a base gasket and a retainer gasket; and
   means for releasably securing, at an ostomy site, both a base gasket and a retainer gasket and for retaining said base gasket in a secured position at the ostomy site during release, removal and replacement of said retainer gasket,
   said securing means comprising at least two fastening elements, each of said elements comprising;
      a body having a recess means for receiving a slotted flange of a base gasket,
      a projection on said body extending outwardly from said recess means and extendable through a slot in a slotted flange of a base gasket and a slot in a slotted flange of a retainer gasket,
      lip means on said projection for releasably retaining a slotted flange of a base gasket in said recess means,
      a slotted tongue hingedly affixed to said projection and extendable through a slot in a slotted flange of a base gasket and a slot in a slotted flange of a retainer gasket, and,
      hook means on said body for releasably securing said slotted tongue.

2. Fastening apparatus as set forth in claim 1 wherein said fastening elements are of a molded plastic material construction.

3. Fastening apparatus as set forth in claim 2 wherein said plastic material is polypropylene.

4. Fastening apparatus as set forth in claim 3 wherein the tongues of said fastening elements have a partially serrated surface.

5. Fastening apparatus for use in securing an ostomy appliance which includes a rigid base gasket having at least two slotted flanges extending in opposed directions and a retainer gasket having at least two slotted flanges extending in opposed direction, which retainer gasket has affixed thereto an expendable ostomy pouch, said fastening apparatus comprising:
   means mounting a base gasket and a retainer gasket; and
   means for releasably securing, at an ostomy site, both a base gasket and a retainer gasket,
   said securing means comprising fastener element means, cooperative with the slotted flanges of said gaskets, for non-adhesively retaining said base gasket in a secured position at the ostomy site during release, removal and replacement of said retainer gasket.

6. Fastening apparatus as set forth in claim 5 wherein said fastener element means comprises at least two fastening elements, each of said elements comprising a body having recess means for receiving a slotted flange of a base gasket.

7. Fastening apparatus as set forth in claim 6 further including:
   a projection on said body extending outwardly from said recess means and extendable through a slot in a slotted flange of a base gasket and a slot in a slotted flange of a retainer gasket; and
   lip means on said projection for releasably retaining a slotted flange of a base gasket in said recess means.

8. Fastening apparatus as set forth in claim 7 further including a slotted tongue hingedly affixed to said projection and extendable through a slot in a slotted flange of a base gasket and a slot in a slotted flange of a retainer gasket.

9. Fastening apparatus as set forth in claim 8 further including hook means on said body for releasably securing said slotted tongue.

10. In combination:
- a rigid base gasket having at least two slotted flanges extending in opposed directions;
- a retainer gasket having at least two slotted flanges extending in opposed directions;
- a pouch affixed to said retainer gasket;
- belt means; and
- means affixed to said belt means for securing at an ostomy site both said base gasket and said retainer gasket, said securing means comprising fastener element means, cooperative with the slotted flanges of said gaskets, for non-adhesively retaining said base gasket in secured position at the ostomy site during release, removal and replacement of said retainer gasket having said pouch affixed thereto.

11. In combination:
- a rigid base gasket having at least two slotted flanges extending in opposed directions;
- a retainer gasket having at least two slotted flanges extending in opposed directions;
- a pouch affixed to said retainer gasket; belt means; and
- means affixed to said belt means for securing at an ostomy site both said base gasket and said retainer gasket and for retaining said base gasket in secured position at the ostomy site during release, removal and replacement of said retainer gasket, said securing means comprising at least two fastening elements, each of said elements comprising;
- a body having a recess means for receiving a slotted flange of a base gasket,
- a projection on said body extending outwardly from said recess means and extendable through a slot in a slotted flange of a base gasket and a slot in a slotted flange of a retainer gasket,
- lip means on said projection for releasably retaining a slotted flange of a base gasket in said recess means,
- a slotted tongue hingedly affixed to said projection and extendable through a slot in a slotted flange of a base gasket and a slot in a slotted flange of a retainer gasket, and,
- hook means on said body for releasably securing said slotted tongue.

* * * * *